(12) United States Patent
Munzinger et al.

(10) Patent No.: US 11,180,199 B2
(45) Date of Patent: Nov. 23, 2021

(54) CONNECTION OF BODY ELEMENTS IN MOTOR VEHICLES

(71) Applicant: SIKA TECHNOLOGY AG, Baar (CH)

(72) Inventors: Noah Munzinger, Zürich (CH); Denis Souvay, Illkirch-Graffenstaden (FR); Urs Rheinegger, Regensdorf (CH)

(73) Assignee: SIKA TECHNOLOGY AG, Baar (CH)

( * ) Notice: Subject to any disclaimer, the term of this patent is extended or adjusted under 35 U.S.C. 154(b) by 71 days.

(21) Appl. No.: 16/614,654

(22) PCT Filed: Jun. 21, 2018

(86) PCT No.: PCT/EP2018/066622
§ 371 (c)(1),
(2) Date: Nov. 18, 2019

(87) PCT Pub. No.: WO2018/234477
PCT Pub. Date: Dec. 27, 2018

(65) Prior Publication Data
US 2020/0198707 A1 Jun. 25, 2020

(30) Foreign Application Priority Data
Jun. 22, 2017 (EP) ...................... 17177311

(51) Int. Cl.
*B62D 27/02* (2006.01)
*B62D 29/00* (2006.01)

(52) U.S. Cl.
CPC ......... *B62D 27/026* (2013.01); *B62D 27/023* (2013.01); *B62D 29/005* (2013.01)

(58) Field of Classification Search
CPC .. B62D 27/026; B62D 27/023; B62D 29/005; F16B 11/008; C09J 2400/163; C09J 5/00
(Continued)

(56) References Cited

U.S. PATENT DOCUMENTS

| | | | |
|---|---|---|---|
| 5,228,259 A | 7/1993 | Haddad et al. | |
| 6,086,143 A * | 7/2000 | Schroeder | B62D 25/04 296/146.11 |

(Continued)

FOREIGN PATENT DOCUMENTS

| | | |
|---|---|---|
| DE | 199 29 057 A1 | 12/2000 |
| WO | 03/047785 A1 | 6/2003 |

OTHER PUBLICATIONS

Aug. 17, 2018 Search Report issued in International Patent Application No. PCT/EP2018/066622.
(Continued)

*Primary Examiner* — Pinel E Romain
(74) *Attorney, Agent, or Firm* — Oliff PLC

(57) ABSTRACT

A system of connected body elements for a motor vehicle includes a first body element and a second body element. The first body element has at least one duct on a surface, wherein a shoulder is formed next to the duct. The system furthermore includes an adhesive which is arranged at least partially in the duct and at least partially on the shoulder and adhesively bonds the first body element to the second body element. A connection region, directly adjoining the shoulder, of the surface of the first body element is free here from adhesive. A first space between shoulder and second body element and a second space between connection region and second body element are open towards each other.

14 Claims, 6 Drawing Sheets

Figure 1:
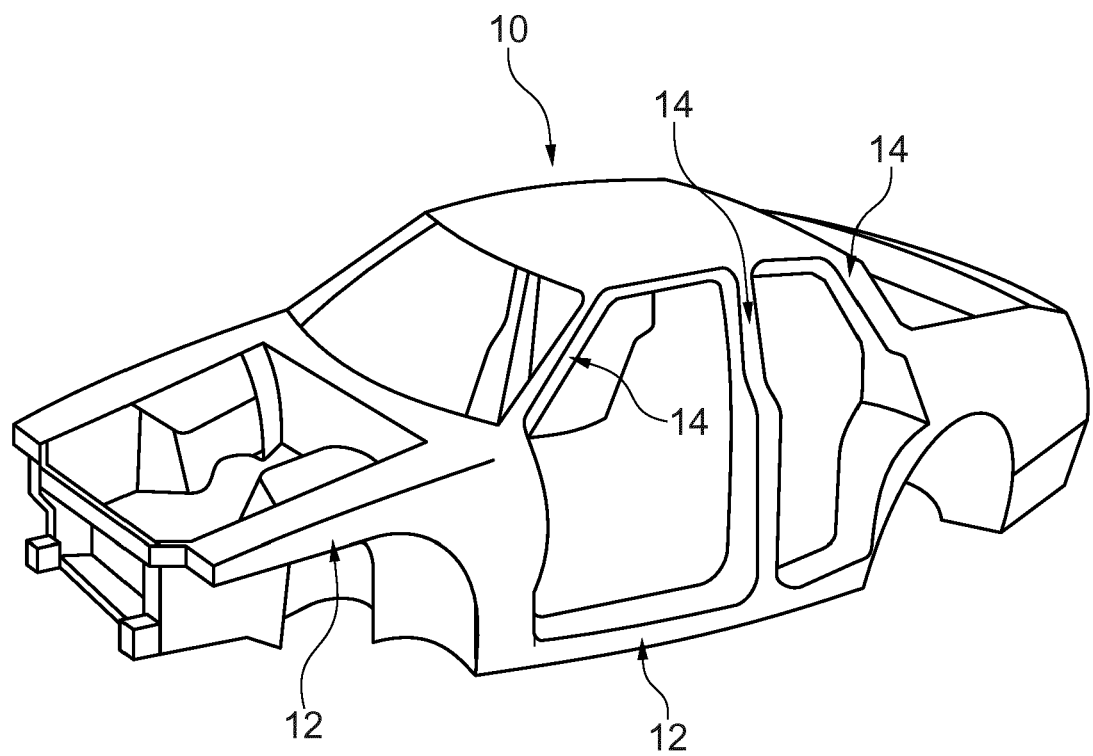

(58) Field of Classification Search
USPC .............................................. 296/29; 29/897
See application file for complete search history.

(56) References Cited

U.S. PATENT DOCUMENTS

| | | | | |
|---|---|---|---|---|
| 6,592,968 | B1 * | 7/2003 | Schmit ................... | B21D 22/00 |
| | | | | 428/172 |
| 6,742,258 | B2 * | 6/2004 | Tarbutton ............. | B21D 26/033 |
| | | | | 29/421.1 |
| 8,998,296 | B2 * | 4/2015 | Eipper ................... | B62D 21/09 |
| | | | | 296/187.01 |
| 9,440,683 | B1 * | 9/2016 | Donabedian ........... | B62D 25/02 |
| 9,533,717 | B2 * | 1/2017 | Haegele ............... | B62D 29/005 |
| 10,077,082 | B2 * | 9/2018 | Anasenzl ............. | B62D 27/026 |
| 10,137,941 | B2 * | 11/2018 | Memili ................... | B29C 66/21 |
| 2011/0158741 | A1 | 6/2011 | Knaebel | |

OTHER PUBLICATIONS

Dec. 24, 2019 International Preliminary Report on Patentability issued in International Patent Application No. PCT/EP2018/066622.

* cited by examiner

CONNECTION OF BODY ELEMENTS IN MOTOR VEHICLES

The invention concerns a system of connected body elements for motor vehicles, and a method for connection of body elements in motor vehicles.

Body elements, such as for example extruded profiles, castings or panels, are often bonded together for connection. Firstly, adhesives are used which are applied to a first element as adhesive beads, wherein a second element to be bonded is then placed on this adhesive bead so that the two body elements can be bonded. Such known methods however have the disadvantage that handling the body elements to be bonded, and the application of adhesive, are firstly complex and secondly have certain restrictions. For example, it is difficult to bond nested elements together using this method. This is because the adhesive bead applied to the first element may be scraped off when the second element is fitted, and may hence no longer be present at the desired position for bonding the elements together.

A further method for bonding elements in body construction of motor vehicles provides that—in particular for nested body elements—a liquid adhesive is injected into a closed chamber in order to thereby bond together the elements to be bonded. A disadvantage of this method is that fluid-tightly closed cavities must be created, which predefine a space for the liquid adhesive. This can be achieved for example with seals and requires elements with very small production tolerances. As a result, such systems are complex and costly to produce.

The invention is therefore based on the object of providing an improved system of connected body elements for motor vehicles, or an improved method for connection of body elements in motor vehicles, which allows body elements in motor vehicles to be connected together more economically and with simpler handling.

This object is initially achieved by a system of connected body elements for a motor vehicle, wherein the system comprises a first body element and a second body element. The first body element has at least one channel on a surface of the body element, wherein a shoulder is formed next to the channel. The system furthermore comprises an adhesive which is arranged at least partially in the channel and at least partially on the shoulder, and adhesively bonds the first body element to the second body element. Here a connection region, directly adjoining the shoulder, of the surface of the first body element is free from adhesive, wherein a first space between the shoulder and the second body element, and a second space between the connection region and the second body element, are open towards each other.

The solution proposed here has firstly the advantage that, for connection of body elements in motor vehicles, no fluid-tightly closed space need be provided for the adhesive, but a cheaper open system may be used which is easier to handle and has no fluid-tightly closed intermediate spaces. Thus body elements may be used which have no seals, which corresponds to a substantial cost advantage. Furthermore, the present invention allows even parts with greater production tolerances to be bonded or connected together because no fluid-tightly closed spaces need be provided for the adhesive. This also corresponds to a substantial cost benefit in comparison with the known systems, because as a result, the various elements of the system can be produced more cheaply and with larger production tolerances. Also, a process of connecting the body elements is easier to implement since filling closed spaces with adhesive entails difficulties which may hereby be avoided, in particular the displacement of air in the closed cavity by the adhesive.

A core concept of the present invention is that by the use of a suitable adhesive, an open system for connecting body elements in motor vehicles may be used. It has namely been observed that with a suitable adhesive, a self-sealing system can be created, on condition that suitably dimensioned channels and shoulders of the first body element are provided.

The adhesive is configured such that on cooling, it has a sharp transition between a non-hardened and a hardened state. This allows components of an open system described here to be bonded with such a suitable adhesive.

The channels are dimensioned such that the adhesive flowing through the channels cools comparatively slowly. This is achieved in particular in that a surface area of the channels is configured so as to be relatively small in comparison with a volume of the channels.

In contrast, in the region between the shoulder and the second body element, the adhesive cools comparatively more quickly. This is achieved in particular in that in this region, a surface area is designed relatively larger in comparison with a volume of this region.

Such a dimensioning of the open system now has the consequence that the adhesive applied in the heated state cools more quickly on the shoulders than in the channel. This leads to a faster hardening of the adhesive on the shoulders than in the channels, and hence to a reliable, self-closing system.

With suitable provision of such channels on the surface of the first body element, now the adhesive introduced into the channels can be distributed in the intermediate space between the first and second body elements, and a self-closing system is created by suitable provision of shoulder regions next to the channels.

The term "open" or "open cavity" in the context of this invention means "fluid-permeable" or "not sealed".

In an exemplary embodiment, the first body element is a profile, a casting or a panel-shaped element, and the second body element is a profile, a casting or a panel-shaped element.

Bodies of motor vehicles are normally constructed from such elements. Various combinations of such elements which are to be connected together may occur. A main advantage of the present invention is that the system for connection of body elements proposed here can be applied universally to widely varying elements, irrespective of their shaping, material or production method. Thus this system may be applied universally in bodywork of motor vehicles.

The term "panel-shaped element" in the context of this invention expressly comprises both elements made of metal and elements made of plastic or fiber-reinforced plastic. This term therefore refers solely to the shape and not to the material of the element.

The term "profile" in the context of this invention expressly comprises elements produced in different ways. For example, this means extrusion profiles, internal high-pressure forming profiles, or rolled panel-shaped elements.

The term "casting" in the context of this invention expressly includes elements which are produced in various ways. Examples are elements produced by dead-mold casting, ingot casting or continuous strand casting.

In an exemplary embodiment, the first body element and/or the second body element consists at least partially of metal, plastic or fiber-reinforced plastic.

In a preferred refinement, the first and/or the second body element consists at least partially of polyamide, in particular PA 6.6 (nylon).

In a preferred refinement, the first and/or the second body element consists at least partially of steel, aluminum or magnesium, or of combinations of these metals.

In an alternative preferred refinement, the first body element and/or the second body element consists at least partially of fiber-reinforced plastics from the group CFRP, GFRP or SMC.

One advantage of the system proposed here is in particular the fact that different materials and material combinations can be connected together.

In an exemplary embodiment, a distance between the shoulder and the second body element is between 0.2 and 5 mm, preferably between 0.5 and 4 mm, particularly preferably between 1 and 3 mm.

Such a distance between the shoulder and the second body element ensures that, in this region of the open cavity between the first body element and the second body element, the adhesive cools and therefore hardens more quickly than in the region of the channels, so that the adhesive is distributed through the channels but cools and hardens in the regions of the shoulders and thereby seals the cavity.

Depending on the composition and application parameters (e.g. temperature or extrusion speed) of the adhesive, the distance between the shoulder and the second body element may be selected differently in order to achieve a desired sealing effect of the adhesive in this region. Also, this distance between the shoulder and the second body element may be used to influence an adhesion area between the first body element and the second body element, wherein a larger distance would lead to a larger adhesion area and a smaller distance to a smaller adhesion area. Depending on whether the priority lies on making the mechanical connection between the body elements as strong as possible, or whether as little adhesive as possible should be used, a suitable solution may be selected here.

In an exemplary embodiment, a channel width is between 5 and 300 mm, preferably between 10 and 70 mm, particularly preferably between 10 and 30 mm.

In an exemplary embodiment, a channel depth is between 0.5 and 10 mm, preferably between 1 and 8 mm, particularly preferably between 2 and 5 mm.

In an exemplary embodiment, a channel length is between 50 and 500 mm, preferably between 70 and 400 mm, particularly preferably between 100 and 300 mm.

Such dimensioning of the channel has the advantage that, as a result, the adhesive cools so slowly on flowing through the channel that the adhesive is distributed over substantially the entire length of the channel, in order thereby to be able to bond the first body element and second body element together reliably.

The channel may have a constant cross-section; in an alternative embodiment however, the channel may also have a non-constant cross-section. The length, width and depth of the channel may be made non-constant. Thus for example, channels can also be produced which are not as deep at the ends as in the middle of the channel (for example, below a filling opening), or channels which have an oval shape in plan view.

Naturally, the channel need not be linear over its entire length, but it may also be curved or have various direction changes.

In general, the channel serves for the rough distribution of the adhesive in the intermediate region provided for bonding between the first and second body elements. Thus a different channel geometry may be advantageous depending on the requirements of the respective application.

Depending on composition and application parameters of the adhesive, the dimensions of the channel in said regions may be adapted to achieve an optimal result. It is desirable that the adhesive only completely cools or hardens in the channel after the desired distribution of the adhesive in the space between the first body element and the second body element has been achieved.

In an exemplary embodiment, the channel has a V-shaped or U-shaped cross-section, or an angular or semicircular form or cross-section.

In an exemplary embodiment, the channel has a substantially W-shaped cross-section. In particular, a floor of the channel has an elevation. Such an elevation may be rounded, undulating, sharp-edged or irregular in form.

Such a substantially W-shaped cross-section of the channel has the advantage that thereby the required quantity of adhesive may be reduced in comparison with channels without such an elevation of the channel floor.

In a further exemplary embodiment, the channel has an irregularly shaped cross-section. For example, a channel floor may then be configured in sloping fashion, so that the adhesive which has hardened therein has a wedge-shaped cross-section. Such a wedge-shaped cross-section of the adhesive and a correspondingly complementarily formed wedge-shaped cross-section of the channel floor may achieve an improvement in the tensile loading of the bonded body elements, because a wedge effect can be achieved by this geometry. Thus for example, the first body element may be better bonded in the second body element with respect to tensile load.

Similarly, the cross-section of the channel may also be formed with an undercut or other catches in order to achieve an even better connection between the elements.

A suitable cross-sectional form of the channel may be selected depending on how quickly the adhesive should flow through the channel and how quickly the adhesive should cool and hence harden in the channel. In principle, the adhesive cools more quickly, the larger the contact area between the adhesive and the first body element. Thus the adhesive will cool more slowly in a semicircular form than in a rectangular cross-sectional form.

In an exemplary embodiment, the channel runs transversely or substantially transversely to a longitudinal direction of the first body element.

In an alternative embodiment, the channel runs along or substantially along a longitudinal direction of the first body element.

In a further exemplary embodiment, the channel runs completely around the first body element and is thus closed in itself.

In a further exemplary embodiment, the channel has branches.

In a further exemplary embodiment, the channel comprises a main channel and side channels connected thereto. The arrangement and design of the channel or channels on the surface of the first body element depends on the points at which the first body element is to be bonded to the second body element. To this end, channels which run completely around the reinforcing element may be provided, several channels which are formed separately from each other may be provided, or channels with branches or side channels may be provided. In particular, side channels may be used to enlarge the adhesive area between the first body element and the second body element.

In an exemplary embodiment, a width of the shoulder measured in the same direction as the channel width is less than 30 mm, preferably less than 20 mm, particularly preferably less than 10 mm, particularly preferably less than 5 mm.

The provision of a shoulder with these dimensions has the advantage that thereby a bonding of the first body element to the second body element can be achieved which requires a small quantity of adhesive. Also, in this way a greater design freedom of the first body element is obtained, since the regions outside the shoulder are not provided for bonding the first body element to the second body element and therefore need not have a predefined shaping. The smaller the shoulder is formed, the greater the design freedom of the first body element.

In an alternative embodiment, a width of the shoulder, measured in the same direction as the channel width, is between 30 and 150 mm, preferably between 40 and 120 mm, particularly preferably between 50 and 100 mm.

The provision of a shoulder with these dimensions however has the advantage that thereby a bonding of the first body element to the second body element can be achieved which has a larger adhesive area, which leads to a mechanically more stable connection between the first and second body elements.

A suitable width of the shoulder may be selected accordingly depending on the requirements and starting situation. To ensure that the spreading of the adhesive on the shoulder is stopped, for example the hardening behavior of the adhesive may be influenced by corresponding adaptation of the adhesive composition, or by a modified adhesive temperature or extrusion rate on introduction of the adhesive into the channel, or by adaptation of the distance between the shoulder and the structural element.

In an exemplary embodiment, a width of a connection region, measured in the same direction as the channel width, is more than 1 mm, preferably more than 20 mm, particularly preferably more than 30 mm, particularly preferably more than 40 mm.

In an exemplary embodiment, the shoulder and the connection region lie in the same plane.

In an alternative embodiment, the shoulder and the connection region do not lie in the same plane.

Since the connection region is not covered with adhesive, the form of this connection region is irrelevant for the bonding. The essential factor is only that the first space between the shoulder and the second body element, and the second space between the connection region and the second body element, are open towards each other.

Depending on the geometry of the first body element and second body element, the connection region of the first body element may be configured suitably.

In a preferred embodiment, the first or the second body element has a filling opening for introduction of adhesive into the channel.

The advantage of such a filling opening is that the adhesive may be introduced directly into the channel.

In a preferred refinement, the filling opening opens directly into the channel. The filling opening may be arranged centrally with respect to a length and/or width of the channel.

Furthermore, the filling opening may be arranged in the first body element which also comprises the channel, or the filling opening may be arranged in the second body element. In principle, the arrangement of the filling opening depends on how accessible the body elements are (in a situation in which the adhesive is to be introduced).

In an exemplary embodiment, the first body element and the second body element are at least partially connected together for pre-fixing of the first and second body elements before the adhesive is introduced. In a preferred embodiment, the body elements are pre-fixed by a unilateral or bilateral mechanical joining method, in particular by riveting, welding, screwing or bolting.

In a further exemplary embodiment, the first body element and/or the second body element comprises at least one element for supporting the first or second body element against the respective other body element. In a preferred embodiment, this element is configured as a protrusion in the first or second body element.

Such elements for fixing and/or supporting the first body element relative to the second body element have the advantage that the body elements remain in an intended position before the adhesive has hardened and/or set.

In an exemplary embodiment, the first body element and the second body element are both profiles. For example, these profiles have differently sized cross-sections so that the smaller profile can be inserted in the larger profile. Here, the channel may be provided either in the smaller or in the larger profile, which means that the larger profile may be either the first body element or the second body element in the sense of this invention.

In a further exemplary embodiment, the first and second body elements are formed respectively as a profile and a panel-shaped element. Here again, the channel may be provided either in the panel-shaped element or in the profile. Depending on this, the profile is accordingly the first or second body element.

In a further exemplary embodiment, the first and second body elements are formed respectively as a casting and a profile. For example, the casting may have an opening in which the profile can be inserted. Again, the channel may be provided either in the profile or in the casting. This again means that the casting may be the first or the second body element in the sense of this invention.

In a further exemplary embodiment, the first and the second body elements are both castings. For example, one of the castings may have an opening in which part of the second casting can be inserted. Again, the channel may be provided in the one or the other casting. Accordingly, the casting with the opening is either the first or the second body element in the sense of this invention.

In a further exemplary embodiment, the first and the second body elements are both panel-shaped elements. The channel may be provided in either the first or in the second panel-shaped element. Accordingly, the first or the second panel-shaped element is the first body element or the second body element in the sense of this invention.

In a further exemplary embodiment, the first and second body elements are respectively a panel-shaped element and a casting. For example, two panel-shaped elements with a U-shaped cross-section may be welded or bonded together to form a cavity. The casting may for example be arranged in this cavity. Again, the channel may be arranged either in the panel-shaped element or in the casting. Accordingly, the casting is the first or second body element in the sense of this invention.

It is self-evident that also more than two body elements may be bonded together.

An essential advantage of the system proposed here is that very differently shaped body elements can be connected together, because channels and shoulders can be provided on any arbitrary element. This allows a versatile use of the system of connected body elements for motor vehicles proposed here.

The object cited initially is furthermore achieved by a method for connecting body elements in a motor vehicle. The method comprises the steps: provision of a first body element which has at least one channel on a surface of the first body element, wherein the surface of the first body element forms a shoulder next to the channel; provision of a second body element; arrangement of the first body element and the second body element such that an open cavity is formed between the channel and the shoulder of the first body element and the second body element; introduction of an adhesive into the channel; and spreading of the adhesive at least partly in the channel and at least partly on the shoulder for bonding the first body element to the second body element, wherein the spreading of the adhesive on the shoulder is stopped.

The method proposed here again offers the same advantages as have already been described with reference to the system of connected body elements proposed here. In particular, the method for bonding body elements may thereby be configured so as to be more economical and with simpler handling.

In an exemplary embodiment, the spreading of the adhesive on the shoulder is stopped by an at least partial hardening of the adhesive on the shoulder.

In an exemplary embodiment, the method comprises the further step: hardening of the adhesive by application of a temperature of at least 120° C., preferably of at least 140° C., particularly preferably of at least 160° C.

For example, the adhesive may be hardened in an oven as normally used in electrophoretic deposition painting (EDP) of the body. Normally, temperatures between 120° C. and 220° C. prevail in such ovens. Such temperatures are particularly suitable for the hardening of adhesives which may be used in connection with this invention. Since the body with the connected body elements and hardened adhesive in any case passes through the process of deposition painting and subsequent heat application for hardening of the paint, a use of this heat application in the oven after deposition painting for hardening the adhesive is particularly advantageous.

In an exemplary embodiment, on introduction into the channel, the adhesive is conveyed from an adhesive tank by a pump.

In an exemplary embodiment, on introduction into the channel, the adhesive is conveyed through a filling opening in the first or in the second body element.

The provision of a filling opening in the first or second body element has the advantage that in this way the adhesive can easily be introduced into the channel, for example by robots.

Adhesive

The adhesive composition described below is an exemplary adhesive which may be used in connection with this invention.

A thermosetting, one-component epoxy compound was produced according to table 1.

TABLE 1

| Raw materials used | |
|---|---|
| Raw materials | Parts by weight |
| Epoxy liquid resin, D.E.R. 331 (bisphenol-A-diglycidyl ether), Dow | 50 |
| Polyester polyol, Dynacol 7380, Degussa AG, Germany | 5 |
| Reactive thinners, hexanediol -glycidyl ether, Denacol EX-212, Nagase America | 1 |
| Viscosity improver D-1 | 34 |
| Hardener, dicyandiamide | 4.78 |
| Accelerant, substituted urea | 0.22 |
| Pyrogenic silicic acid | 5 |

Production of a Viscosity Improver ("D-1")

150 g poly-THF 2000 (OH number 57 mg/g KOH) and 150 Liquiflex H (OH number 46 mg/g KOH) were dried for 30 minutes under vacuum at 105° C. After the temperature had been reduced to 90° C., 61.5 g IPDI and 0.14 g dibutyl tin dilaurate were added. The reaction was conducted under vacuum at 90° C. until the NCO content remained constant at 3.10% after 2.0 h (calculated NCO content: 3.15%). Then 96.1 g cardanol were added as a blocking agent. Agitation continued at 105° C. under vacuum until no more free NCO could be found. The product was then used as the viscosity improver D-1. The following raw materials were used:

Poly-THF 2000 (difunctional polybutylene glycol)
(OH equivalent weight = approx. 1000 g/OH equivalent), BASF
Liquiflex H (hydroxyl-terminated polybutadiene)
(OH equivalent weight = approx. 1230 g/OH equivalent), Krahn
Isophorone diisocyanate (= "IPDI"), Evonik
Cardolite NC-700 (cardanol, meta-substituted alkenyl-monophenol), Cardolite Production of Master Batch The polyester polyol, at around 40° C. above its softening point of 77° C. (approx. 100-140° C.), was mixed with liquid epoxy resin for around 30 minutes until a clear mixture resulted (approx. 33 wt. % polyester polyol relative to the total weight of the master batch). The master batch was then cooled to around 100° C.

Production of Thermosetting One-Component Epoxy Compound:

The other components of the epoxy compound were mixed into a homogenous mass, preferably at temperatures of around 50 to 90° C. As soon as the mixture was homogeneous, the master batch was added in liquid form (temperature of master batch 100° C.) and mixed immediately.

The thermosetting one-component epoxy compound was injected at a temperature of 60° C. and an injection rate of 50 ml/min.

Figure 2A:
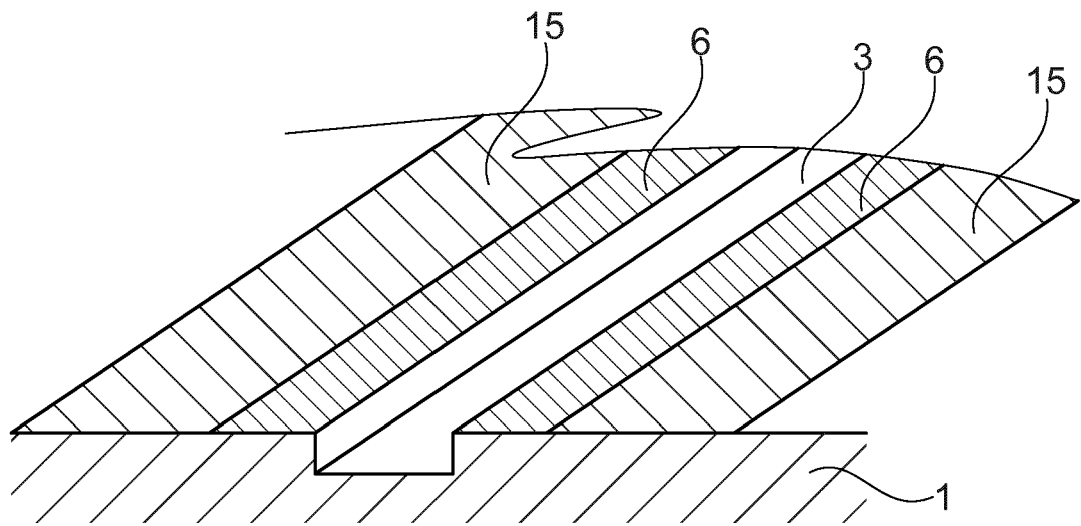
Figure 2B:
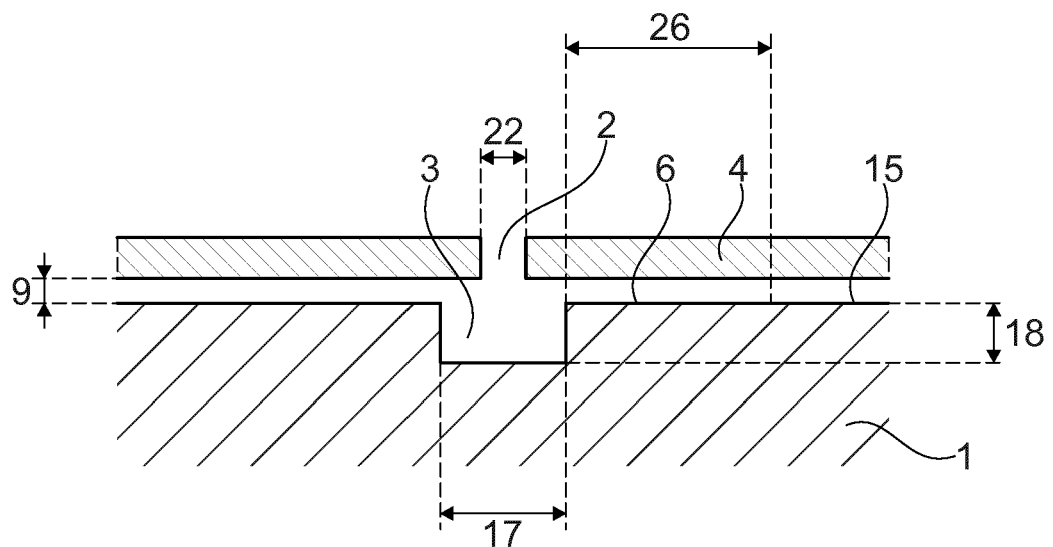
Figure 3A:
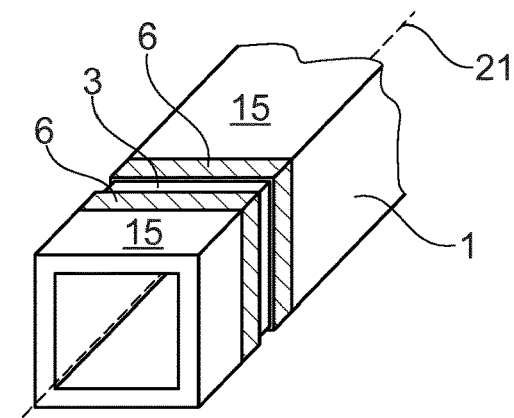
Figure 3B:
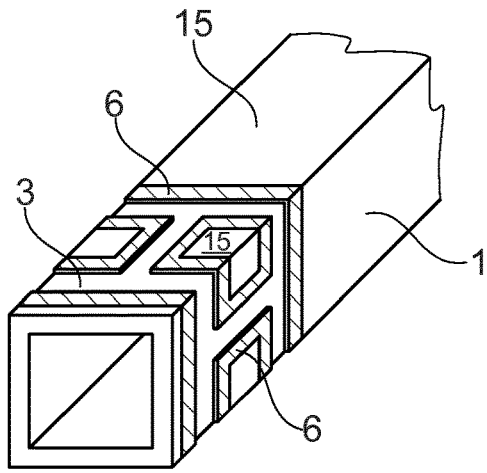
Figure 3C:
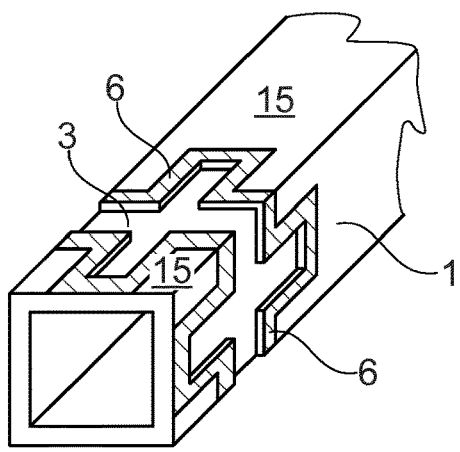
Figure 5A:
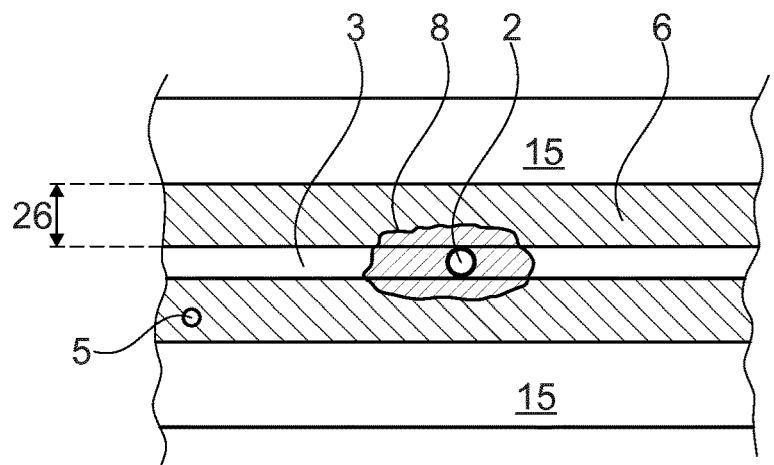
Figure 5B:
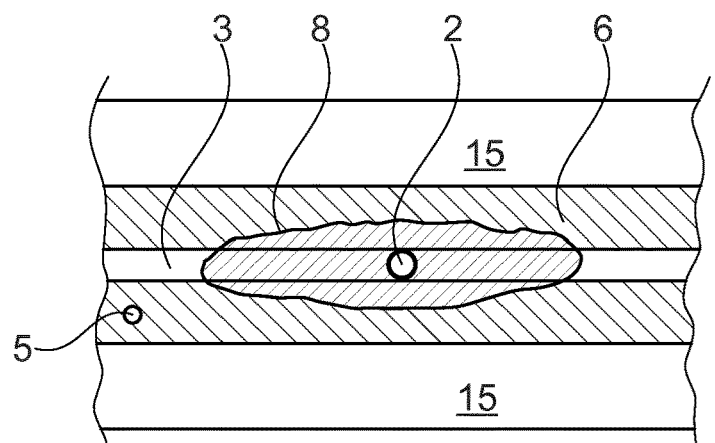
Figure 5C:
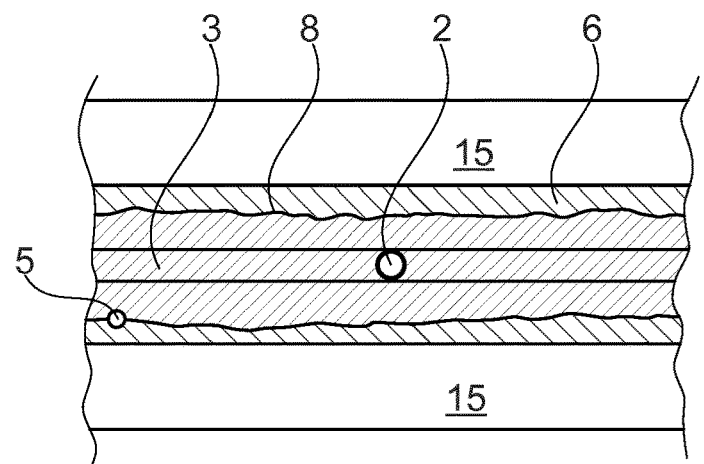
Figure 6:
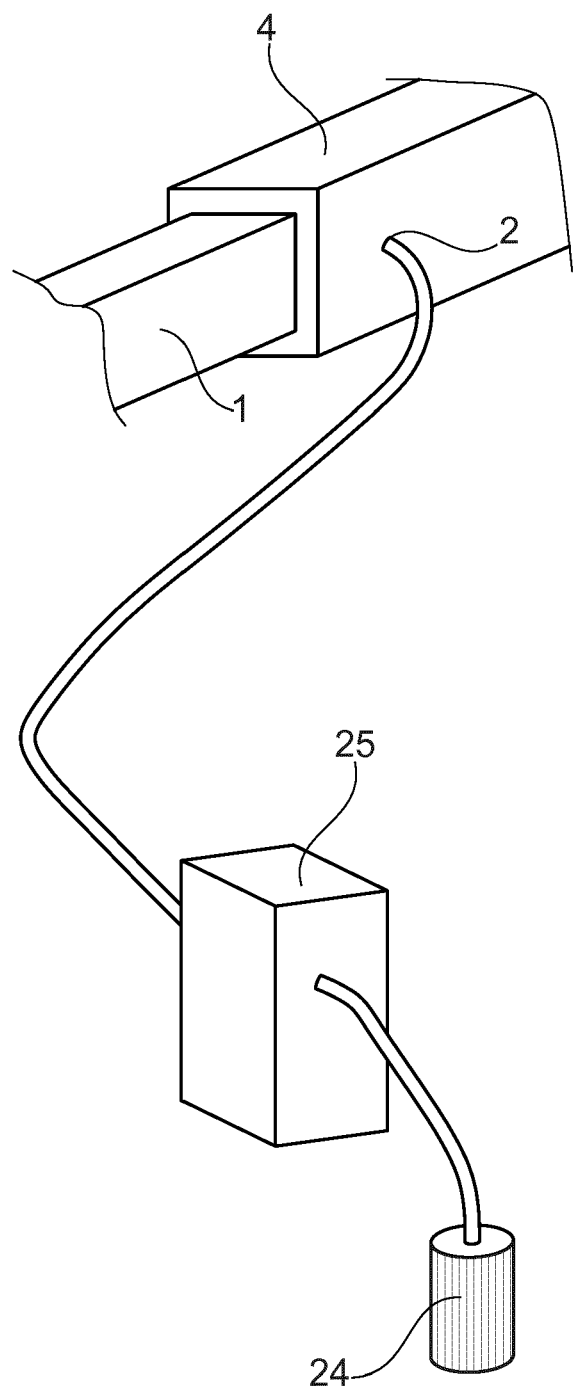

Details and advantages of the invention are described below in relation to exemplary embodiments and with reference to diagrammatic drawings. The drawings show:

FIG. 1 an exemplary depiction of a body of a motor vehicle;

FIG. 2a a diagrammatic depiction of an exemplary first body element in cross-section;

FIG. 2b a diagrammatic depiction of an exemplary first and second body element;

FIGS. 3a to 3c a diagrammatic depiction of an exemplary first body element;

FIGS. 4a to 4f a diagrammatic depiction of various exemplary combinations of a first and a second body element;

FIGS. 5a to 5c a diagrammatic depiction of an exemplary introduction of an adhesive into an intermediate space between a first and a second body element; and FIG. 6 a diagrammatic depiction of an introduction device.

FIG. 1 shows diagrammatically a body 10 of a motor vehicle. The body 10 comprises various structures, such as for example pillars 14 and cross struts 12. These and other structures of the body 10 must be connected together in a suitable fashion. In particular, profiles, castings and panel-shaped elements may be connected together.

FIG. 2a shows diagrammatically a cross-section of an extract of a first body element 1. The first body element 1 has on its surface a channel 3. The surface of the first body element 1 next to the channel 3 forms a shoulder 6. Next to the shoulder 6 is a respective connection region 15. On connection of the first body element 1 to the second body element (not shown in FIG. 2a), the adhesive is spread in the channel 3 and on the shoulders 6.

FIG. 2b shows diagrammatically a cross-section of an extract of a first body element 1 and a second body element 4. The first body element 1 again comprises a channel 3 formed on the surface of the first body element 1. The channel 3 has a channel width 17 and a channel depth 18. The cross-section of the channel 3 is rectangular in this exemplary embodiment. Again, a shoulder 6 is formed next to the channel 3. The shoulder 6 has a shoulder width 26. The connection region 15 is arranged next to the shoulder 6.

The second body element 4 is now arranged relative to the first body element 1 such that a distance 9 exists between the shoulder 6 of the first body element 1 and the surface of the second body element 4.

In this exemplary embodiment, the second body element 4 has a filling opening 2 with a diameter 22. The adhesive (not shown in this figure) can be introduced into the channel 3 through this filling opening 2.

In an alternative embodiment (not shown), the filling opening may also be arranged in the first body element 1. Depending on accessibility, arranging the filling opening in the first or the second body element may entail advantages.

FIGS. 3a to 3c show various embodiments of an exemplary first body element 1. The first body element 1 in each case has a longitudinal axis 21. At least one channel 3 is arranged on a surface of the first body element 1. Also, the first body element 1 has a respective shoulder 6 next to the channel 3, and a connection region 15 is arranged directly adjacent to the shoulder 6. In this exemplary embodiment, the first body element 1 is designed as a profile.

The exemplary first body element 1 in FIG. 3a has a channel 3 which runs completely around the first body element 1 and is closed in itself. The channel 3 in this exemplary embodiment is also arranged transversely to the longitudinal axis 21 of the first body element 1.

In the exemplary embodiment in FIG. 3b, the first body element 1 has two channels 3 which each run completely around the first body element 1. Also, the two continuous channels 3 are connected together by side channels.

The exemplary embodiment of a first body element 1 shown in FIG. 3c also has a channel 3 which runs completely around the first body element 1. In contrast to the exemplary embodiment in FIG. 3a, in the exemplary embodiment in FIG. 3c, the continuous channel 3 also has side channels on each long side of the first body element 1 so that the adhesive can be distributed more widely on the first body element 1.

FIGS. 4a to 4f show different exemplary combinations of a first body element 1 with a second body element 4. It is self-evident that many other combinations (not shown) are possible.

Figure 4A:
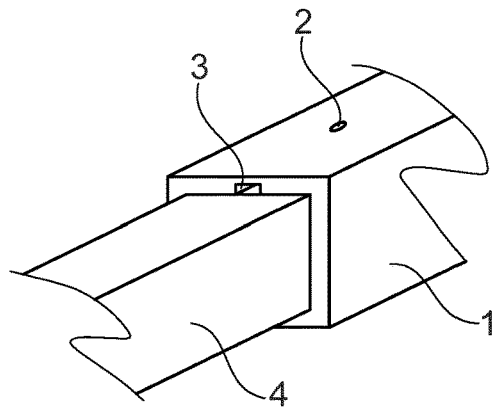

In FIG. 4a, both the first and the second body element 1, 4 are formed as profiles. In this exemplary embodiment, the first body element 1 has a greater diameter than the second body element 4. To connect the body elements, the second body element 4 may be inserted in the first body element 1. The first body element 1 has a channel 3 on one surface. The first body element 1 also has a filling opening 2. Thus adhesive may be introduced into the channel 3 through the filling opening 2 in order to bond the first body element 1 to the second body element 4. In an alternative embodiment, the channel 3 and/or the filling opening 2 may also be arranged in the smaller profile.

Figure 4B:
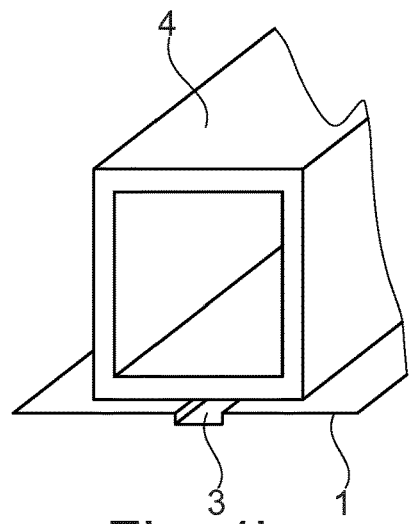

The exemplary embodiment shown in FIG. 4b has a first body element 1 formed as a panel-shaped element, and a second body element 4 formed as a profile. In this exemplary embodiment, the panel-shaped first body element 1 has a channel. The filling opening for introduction of the adhesive into the channel 3 is not evident in this depiction.

Figure 4C:
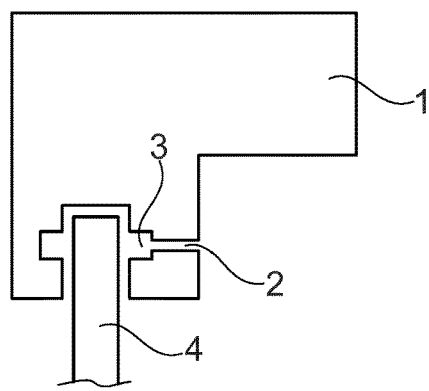

FIG. 4c shows a further exemplary embodiment of a combination of first and second body elements. Here, the first body element 1 is formed as a casting and the second body element 4 as a profile. In this exemplary embodiment, the channel 3 is arranged in the casting. A filling opening 2 is also arranged in the casting.

Figure 4D:
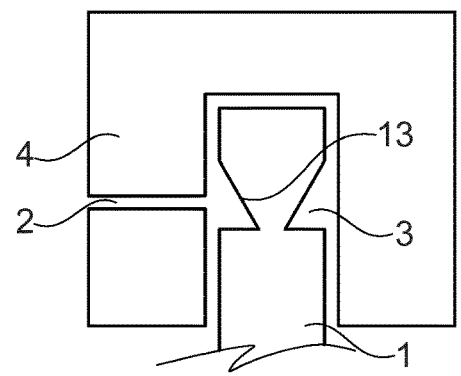

FIG. 4d shows a further combination of an exemplary first body element 1 and an exemplary second body element 4. In this exemplary embodiment, the first body element 1 is formed as a casting and the second body element 4 is also formed as a casting.

In this exemplary embodiment, the channel has an asymmetrical cross-section, wherein a channel bed 13 is formed sloping. As a result, both the adhesive which has hardened in the channel 3 and the casting 1 have a wedge-shaped cross-section in this region. If, after bonding of the first body element 1 to the second body element 4, the first body element 1 is now loaded with a force acting in the direction of the longitudinal axis of the first body element 1, the wedge-shaped cross-sections of the adhesive and of the first body element 1 achieve a better anchoring of the first body element 1 in the second body element 4.

Figure 4E:
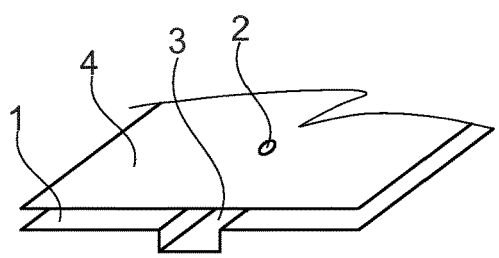

FIG. 4e shows a further exemplary embodiment of a first body element 1 and a second body element 4. In this exemplary embodiment, both the first body element 1 and the second body element 4 are formed as panel-shaped elements. The first body element 1 again has a channel 3 in its surface.

Figure 4F:
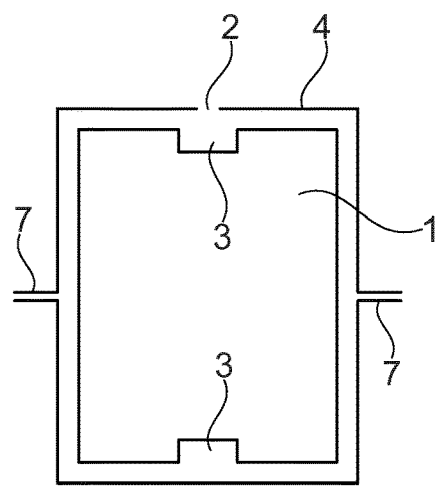

FIG. 4f shows a further exemplary embodiment of a combination of a first body element 1 and a second body element 4. In this exemplary embodiment, the first body element 1 is formed as a casting, and the second body element 4 consists of panel-shaped elements which are connected together. In this exemplary embodiment, two panels with U-shaped cross-section are bonded or welded together at flanges 7. The casting 1 is now arranged in the resulting cavity. In this exemplary embodiment, two channels 3 are evident which are again formed on a surface of the first body element 1. The filling opening 2 in this exemplary embodiment is formed in the second body element 4.

FIGS. 5a to 5c show an exemplary process of introducing the adhesive 8 into an intermediate space between the first body element and the second body element. FIG. 5a shows a situation shortly after starting the introduction of the adhesive 8. FIG. 5b shows a situation in which the adhesive 8 already introduced has largely spread along the channel 3, into which at the same time new adhesive 8 is still being introduced. FIG. 5c finally shows a situation in which the adhesive 8 has been fully introduced into the intermediate space, and the first body element is bonded to the second body element in the proposed fashion.

The adhesive 8 is introduced into the channel 3 through a filling opening 2. The liquid adhesive 8 spreads largely in the direction of the channel 3 and flows at least partly onto the shoulder 6 of the first body element. Because the distance between the shoulder 6 and the second body element is smaller than the distance between a floor of the channel 3 and the second body element, the adhesive 8 cools more quickly in the region of the shoulder than in the region of the channel 3, and hardens as a result of this cooling. This leads to a self-sealing function of the adhesive 8 in the region of the shoulder 6. The system is here configured such that the adhesive 8 does not flow over the region of the shoulder 6, so the connection region 15 remains free from adhesive 8.

Also, in this exemplary embodiment, a test opening 5 is provided for checking the progress of spreading of the adhesive 8 in the intermediate region between the first body element and the second body element.

In FIGS. 5a and 5b, the adhesive 8 has not yet spread as far as the test opening 5. FIG. 5c however shows a situation in which the adhesive 8 fills the intermediate space between the first body element and the second body element in the proposed fashion, and thus reaches the test opening 5.

The exemplary embodiment shown in FIGS. 5a to 5c may comprise for example a first and a second body element which are formed as panel-shaped elements. A corresponding side view of such a combination of a first and a second body element is shown in FIG. 4e.

FIG. 6 shows a device for introducing the adhesive into the intermediate region between the first and second body elements (not visible on this depiction). A pump 25 conveys adhesive from an adhesive tank 24 through a filling opening 2 in the first body element into the intermediate space between the first and the second body element. In this exemplary embodiment, the channel of the first body element 1 is not visible because it is completely covered by the second body element 4.

LEGEND FOR FIGURES

1 First body element
2 Filling opening
3 Channel
4 Second body element
5 Test opening
6 Shoulder
7 Flange
8 Adhesive
9 Distance between shoulder and second body element
10 Body
12 Cross strut
13 Channel bed
14 Pillar
15 Connection region
17 Channel width
18 Channel depth
21 Longitudinal axis
22 Diameter of filling opening
24 Adhesive tank
25 Pump
26 Shoulder width

The invention claimed is:

1. A system of connected body elements for a motor vehicle, the system comprising:
a first body element which has at least one channel on a surface of the body element, a shoulder being formed next to the channel;
a second body element; and
an adhesive which is arranged at least partially in the channel and at least partially on the shoulder and adhesively bonds the first body element to the second body element,
wherein the adhesive is at least partially hardened on the shoulder so as to stop spreading of the adhesive on the shoulder,
a connection region, directly adjoining the shoulder, of the surface of the first body element is free from adhesive, and
a first space between the shoulder and the second body element, and a second space between the connection region and the second body element, are open towards each other.

2. The system as claimed in claim 1, wherein the first body element is a profile, a casting, or a panel-shaped element, and
the second body element is a profile, a casting, or a panel-shaped element.

3. The system as claimed in claim 1, wherein at least one of the first body element and the second body element consist at least partially of metal, plastic, or fiber-reinforced plastic.

4. The system as claimed in claim 1, wherein a distance between the shoulder and the second body element is between 0.2 and 5 mm.

5. The system as claimed in claim 1, wherein at least one of (i) a channel width is between 5 and 300 mm, (ii) a channel depth is between 0.5 and 10 mm, and (iii) a channel length is between 50 and 500 mm.

6. The system as claimed in claim 1, wherein the channel runs completely around the first body element and is thus closed in itself.

7. The system as claimed in claim 1, wherein at least one of (i) the channel has branches, and (ii) the channel comprises a main channel and side channels connected thereto.

8. The system as claimed in claim 1, wherein a width of the shoulder, measured in the same direction as the channel width, is less than 30 mm.

9. The system as claimed in claim 1, wherein a width of the connection region, measured in the same direction as the channel width, is more than 1 mm.

10. The system as claimed in claim 1, wherein the shoulder and the connection region lie in the same plane.

11. A method for connecting body elements of a motor vehicle, the method comprising the steps:
provision of a first body element which has at least one channel on a surface of the first body element, the surface of the first body element forming a shoulder next to the channel;
provision of a second body element;
arrangement of the first body element and the second body element such that an open cavity is formed between the channel and the shoulder of the first body element and the second body element;
introduction of an adhesive into the channel; and
spreading of the adhesive at least partly in the channel and at least partly on the shoulder for bonding the first body element to the second body element, wherein the spreading of the adhesive on the shoulder is stopped by an at least partial hardening of the adhesive on the shoulder.

12. The method as claimed in claim 11, wherein on introduction into the channel, at least one of (i) the adhesive is conveyed from an adhesive tank by a pump, and (ii) the adhesive is conveyed through a filling opening in the second body element.

13. The method as claimed in claim 11, wherein the method comprises the step of hardening of the adhesive by application of a temperature of at least 120° C.

14. The method as claimed in claim 11, wherein the method is carried out with elements of a system of connected body elements for a motor vehicle, the system comprising:
   a first body element which has at least one channel on a surface of the body element, a shoulder being formed next to the channel;
   a second body element; and
   an adhesive which is arranged at least partially in the channel and at least partially on the shoulder and adhesively bonds the first body element to the second body element,
   wherein a connection region, directly adjoining the shoulder, of the surface of the first body element is free from adhesive, and
   a first space between the shoulder and the second body element, and a second space between the connection region and the second body element, are open towards each other.

* * * * *